United States Patent [19]
Pogorski

[11] 3,862,576
[45] Jan. 28, 1975

[54] GEOCHEMICAL EXPLORATION METHOD

[76] Inventor: Louis August Pogorski, 660 Eglinton Ave., West, Toronto, Ontario, Canada

[22] Filed: May 22, 1972

[21] Appl. No.: 255,505

[52] U.S. Cl............... 73/432 R, 23/230 EP, 55/16, 73/421.5 R
[51] Int. Cl............................................. G01v 9/00
[58] Field of Search............ 73/432 R, 421.5 R, 23, 73/23.1, 61.1, 61.1 C; 23/230 ED; 55/16, 158; 210/188

[56] References Cited
UNITED STATES PATENTS

| | | | |
|---|---|---|---|
| 1,843,878 | 2/1932 | Laubmeyer | 73/421.5 R |
| 2,330,829 | 10/1943 | Landberg | 23/230 EP |
| 2,479,787 | 8/1949 | Stevens | 73/421.5 R |
| 3,028,313 | 4/1962 | Oberdorfer | 23/230 EP |
| 3,490,288 | 1/1970 | Patnode | 73/421.5 R |
| 3,624,710 | 11/1971 | Carter et al. | 73/61.1 R |

*Primary Examiner*—S. Clement Swisher
*Attorney, Agent, or Firm*—Weldon F. Green

[57] ABSTRACT

A method of geochemical prospecting by locating areas of anomalously high concentrations of elements indicative of subsurface deposits such as hydrocarbons or radioactive minerals in which the presence of the indicative elements is detected by placing a gas reservoir in communication with the subsurface environment and allowing the elements to transfer under partial pressure from the subsurface environment to the gas pocket and then removing a sample of the gas pocket for analysis to determine the presence of the indicative element.

6 Claims, 8 Drawing Figures

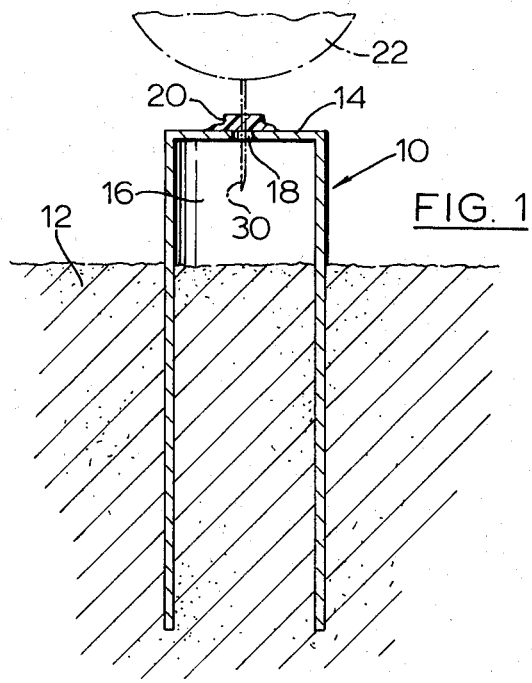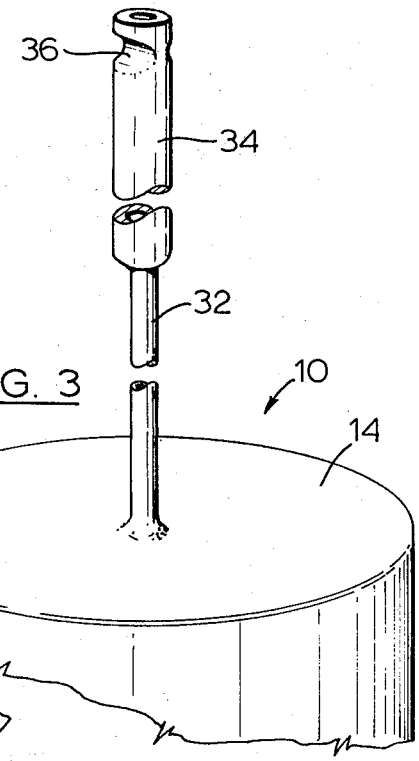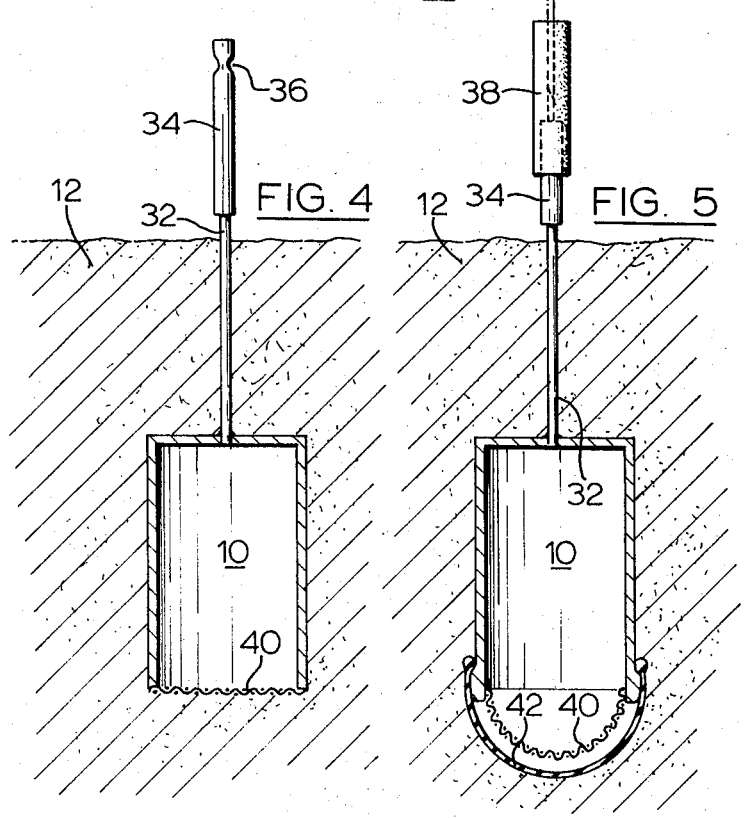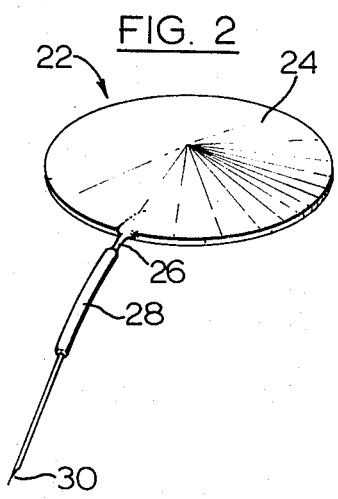

GEOCHEMICAL EXPLORATION METHOD

This invention relates to methods of geochemical prospecting and exploration for valuable subsurface deposits.

This application expands upon the knowledge previously disclosed in co-pending U.S. application Ser. No. 139,347 for "GEOCHEMICAL EXPLORATION METHOD" by the same inventor.

In particular, this invention relates to a method for detecting subsurface accumulations which may contain hydrocarbon deposits such as natural gas, petroleum or bitumen and for detecting locations of radioactive mineral ore deposits such as those of uranium and thorium. More particularly this invention relates to exploration techniques for sampling and detecting the presence of volatile indicators characteristic of such deposits.

Many techniques of geochemical prospecting have been known for some time. These methods of exploration depend on the fact that geochemical and geophysical forces acting on subsurface accumulations, whether they be hydrocarbons, mineral ores or otherwise, cause many of the elements and compounds which constitute or are associated with the deposits to migrate to the surrounding rocks or soil strata. During the migration decomposition or reactions involving these constituents may take place, secondary components may be formed of the original primary constituents or the primary or secondary constituents may be partially or completely adsorbed in the soil or rock or absorbed in ground fluid or overlying bodies of water.

Whatever the course of events the progress of migration introduces or superimposes the presence of components related to the subsurface deposits on the normal composition of the surrounding strata, which normal composition may be referred to as the "background." Typically the concentration of the superimposed migrated constituents will be at a maximum near the source of accumulation and will decrease to a minimum approaching that of the background composition at some distance from the source. The development of the concentration patterns is affected by many variables such as temperature, concentration, partial pressure of the given component at the source, porosity of the surrounding strata, presence of micro or macro fissures, interaction of the migrating constituents with the surrounding material, and other factors. The migration of constituents from the source deposit, and therefore the pattern of concentration of these migrating constituents will extend from the source deposit to the surroundings in any or all directions and may reach the vicinity of the earth's surface.

Migrating constituents which are characteristic of their source accumulation are referred to as "indicators" and manifestations of the penetration of these indicators into the surrounding strata are referred to as "seeps." A concentration level of a given constituent or component different from that considered normal for the background composition in a given geographical area is referred to as a "geochemical anomaly." Detection and tracing of the geochemical anomaly to its source is the subject of geochemical prospecting and exploration whereby valuable subsurface deposits are discovered.

As many of the more easily detected valuable deposits are discovered the need for sophisticated equipment and techniques for detecting faint indications of these valuable deposits becomes apparent.

Known geochemical exploration methods, which are not described in detail herein, have involved, inter alia, collection of soil, subsurface water or gas samples followed by analysis of such samples for trace components regarded as indicators of underground deposits of a specific type. These previously known techniques for geochemical exploration have been subject to inaccuracy, errors and misinterpretations for a variety of reasons and in many cases have failed to detect the presence of an anomaly. For instance hydrocarbon anomalies may be due to hydrocarbons formed by decomposition of organic matter as well as sources of natural gas or petroleum. While attempts have been made to isolate specific components considered characteristic of hydrocarbon deposits, the fact remains that many organic or organo-metallic compounds and a number of inorganic compounds can be formed through chemical or biochemical reactions between subsurface components not related to the deposits of interest and thereby resulting in false anomalies.

On the other hand indications of the possible presence of natural gas, petroleum or radioactive mineral deposits may be obtained by the detection of subsurface anomalies of some gases, particularly of helium.

It is known that trace quantities of helium (approximately five parts per million) are fairly uniformly distributed throughout the troposphere and the earth's crust. Higher concentrations of helium are however often associated with hydrocarbon accumulations such as natural gas and petroleum as well as with radioactive mineral deposits such as those of uranium and thorium. Although the origin of the normal or background composition of helium in the earth's crust may not be completely known it is known that helium is produced as a result of the process of radioactive decomposition which takes place constantly throughout the earth's crust. No doubt this is one source of the helium which is found uniformly distributed throughout the troposphere and in the earth's crust.

Helium is often found in abundance associated with hydrocarbon and bitumen deposits for reasons which are not fully understood. The presence of anomalously high concentrations of helium associated with natural gas and petroleum deposits may be explained by the probability that those physical features which entrap such fluid substances as natural gas and petroleum also tend to entrap quantities of naturally occurring gases such as helium. These traps may be formed in many ways; commonly they are caused by the occurrence of a dense impermeable zone which forms a barrier preventing fluids from flowing or migrating away through more permeable layers.

In the case of radioactive mineral deposits a higher than average concentration of helium may be explained by the fact that the helium is produced by radioactive decomposition and is therefore produced in greater quantities in the area of radioactive mineral deposits.

Helium's low molecular weight, high volatility, inert properties, relatively low solubility and low adsorption and absorption coefficients make it a constituent likely to migrate from a source accumulation to surrounding strata, and perhaps to the surface, in an unaltered state. Furthermore, unlike many other constituents associated with hydrocarbons helium is not released by chemical or biochemical decomposition or organic matter. It therefore follows that subsurface concentrations of helium higher than average terrestrial abuundance of approximately five parts per million, or higher than the local "background" concentration are good indicators of possible subsurface accumulations which might contain natural gas, petroleum or radioactive minerals. A determination as to which of the above deposit types may be indicated by the presence of the helium concentration anomaly may be made by considering other geological and geochemical evidence.

It should also be understood that although helium is referred to as being a good indicator for the purposes mentioned other gases, including hydrocarbons, might serve the same purpose. Both neon and argon are also produced by radioactive decomposition but are present in such large quantities in the air that identification of anomalies is difficult. Radon is also produced by radioactive decomposition and may be detected by radioactive means but since it is found in such very small quantities it requires that large samples be taken and this requirement introduces difficulties in the circumstances under which this type of geochemical exploration is conducted. In addition the short half life of radium tends to diminish the usefulness of this element in detecting deep subsurface deposits where migration of the constituent to the vicinity of the surface would take a long time.

Aside from the inaccuracies previously mentioned previously known geochemical exploration techniques have been unsatisfactory for reasons connected with the manner of collecting the subsurface samples. Typical gas sample collection techniques previously used have involved withdrawing relatively large samples of subsurface gases through a system such as a suction pump and a tube inserted into the ground. Attempts to draw large samples of subsurface gases tend to disturb the equilibrium of the conditions existing in the subsurface to such a degree that the collection of a representative sample is not possible. The effect of withdrawing large gas samples by suction is to induce movements of gases within the subsurface pores which cause differential flow or fractionation. In addition dilution of the sample often occurs as a result of leaking of the atmospheric air around the suction tube which is inserted into the ground and thus inaccuracies are introduced into the sample data and interpretation is made difficult.

I have previously found that in order to obtain a representative subsurface sample within the desired accuracy of about one part per million it is necessary to withdraw small samples, in the order of less than 100 cubic centimetres (at normal temperature and pressure) and that this can be done by inserting a long slender shaft having a very small capillary bore capable of being opened at the lower end. This particular technique is the subject of my co-pending U.S. Pat. application Ser. No. 139,347, filed May 3, 1971 for "GEOCHEMICAL EXPLORATION METHOD."

Where it is desirable to detect the presence of helium as an indicator additional difficulties are presented by its high volatility and relatively low solubility. Therefore collection of soil and water samples for analysis of helium content do not afford a reliable means of tracing helium anomalies.

In many cases a portion of any gases migrating from underground deposits will reach the earth's surface and enter the troposphere. Under ideal conditions, if the seep was strong enough, there was no wind, and no atmospheric contamination, air samples taken in the vicinity of the seep might indicate an anomalous concentration of helium or other volatile trace components. However these conditions rarely exist. Subsurface gases on the other hand are restricted in their movement by the surrounding strata and the state of thermodynamic equilibrium between all phases present is approached. Gases and other components underground that exert a recognizable vapour pressure are detectable by means of underground gas sampling. Therefore the magnitude of the gas seep will be much more recognizable than it would be from surface air sampling.

In addition it should be recognized that where a seep occurs in ground which is overlain by water such as swamps, quiet rivers, lakes or oceans the migrating volatile constituents will dissipate in the water at a much slower rate than they would disappear into the atmosphere where they are subjected to the extreme movement by wind. This tendency of water to confine seeps of volatile constituents may be useful in geochemical sampling for somewhat the same reasons that it is feasible to obtain representative samples from subsurface soil, as will be discussed hereafter.

It is the object of the present invention to provide a way, hereinafter described, by which one can detect subsurface anomalies by obtaining gas samples containing concentrations of indicator constituents representative of the conditions in the subsurface and which are relatively free of distortion and the inaccuracies previously described. It is also an object of this invention to provide a technique for sampling and testing for anomalies of subsurface indicators in areas where the ground is wet or frozen or is overlain by water.

I have found that it is possible to conduct geochemical exploration, involving the location of high concentration of volatile indicators such as helium by presenting an entrapped pocket of a gas of known background composition in communication with the subsurface soil or underground environment of interest through a permeable or semi-permeable barrier so that any volatile constituents, such as indicator gases, which occur in abnormally high concentrations in the environment will tend to transfer, as a result of their partial pressures, to the gas pocket until equilibration is approached thereby providing the gas reservoir having a concentration of indicator representative of the tested environment, from which reservoir a sample may be taken for analysis.

Examples of the way in which this concept may be used will be discussed in the following paragraphs.

In the drawings, which illustrate embodiments of the use of the technique,

FIG. 1 is a vertical cross-section view of a cannister providing an entrapped gas pocket in communication with the subsurface soil and illustrates the use of a sampling vessel in extracting a sample from an entrapped air pocket.

FIG. 2 illustrates a fluid sampling vessel suitable for use in the techniques of this invention.

FIG. 3 shows an alternative type of cannister.

FIG. 4 illustrates a cannister of the type in FIG. 3 buried at a depth in soil.

FIG. 5 illustrates means for extracting a sample from the device of FIG. 4 and additional modifications to the cannister.

Figure 6:
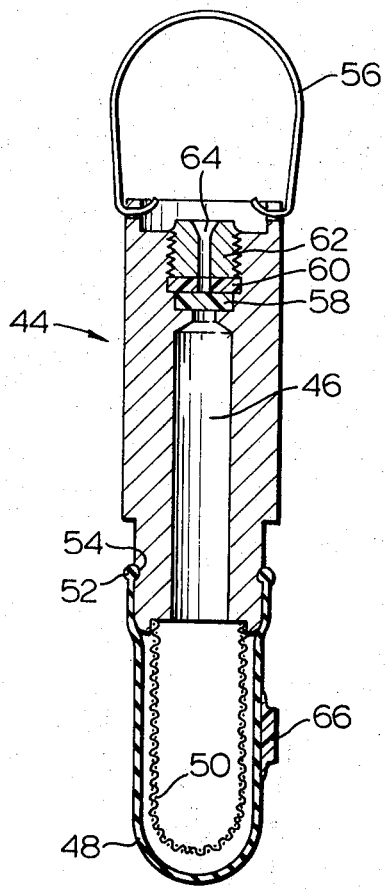
FIG. 6 shows a cannister of the type suitable for use in underwater sampling.

The present invention involves the presentation of an otherwise confined gas pocket to communication with the subsurface environment to be tested through a permeable or semipermeable barrier or membrane so as to allow equilibration of constituent members between the environment and the gas pocket itself so that the gas pocket provides a representative sampling reservoir from which samples may be extracted to detect concentrations of constituent indicators which may be present in the subsurface soil gases.

One way of utilizing the inventive concept is illustrated in FIG. 1 in which an open bottomed tube or cannister 10 having a closed upper end 14 is used. The cannister's open end is driven into the ground as shown in FIG. 1 until the top end protrudes a short way, in the order of 1 to 4 inches, above the ground, thereby providing an enclosed cavity 16 above the surface of the soil in which ordinary ambient air is trapped. One of these devices may be used at each point where it is desired to take a sample in the exploration program. The lower end of the cannister being open is exposed to the subsurface environment 12 so that gases or individual constituent members of the gas mixtures may exchange themselves between the environment and the cavity or pocket. Since it is the purpose of the cannister to entrap a volume of air it follows that it will be necessary that the cannister be one that is relatively impermeable to the gases which it is desired to collect. It is also preferable that it be of material which is not inclined to corrode or create contamination. For instance stainless steel, aluminum or brass would be suitable. In the example shown in FIG. 1 the closed top end is provided with a disc 20 of a soft puncturable material such as silicone rubber which constitutes a septum through which may be inserted the sharpened end 30 of a gas sampling vessel 22 (such as shown in FIG. 2) as illustrated in FIG. 1. In FIG. 1 a hole is illustrated at 18 which allows insertion of the sharpened end of the sampling vessel. It should be realized that in order to contain a highly volatile substance such as helium it will be necessary that the upper surface 14 be intact and the hole 18 should only be punctured beneath the septum at the time a sample is to be taken. It should further be realized that once the upper surface 14 and the septum 20 are punctured to take a sample the device will become permeable to such highly volatile material as helium and the ability of the device to contain an accurate gas sample may then be substantially diminished.

Although various devices may be used for withdrawing a gas sample from the entrapped pocket a suitable device is one shown in FIG. 2 in which the reservoir is contained between two dome-shaped discs 24. The reservoir may be exhausted by squeezing the two halves together and when the two halves are snapped open the container will inhale a sample through the capillary bore 26 which has a portion made of soft material as shown at 28 suitable for crimping to seal the device. The capillary also has a sharpened point 30 suitable for insertion in a septum such as that shown at 20 in FIG. 1. The details of this sampling vessel are contained in Canadian Pat. No. 989,193 and U.S. Pat. No. 3,663,928.

FIG. 1 illustrates how a sample of gas entrapped in the pocket 16 may be obtained by insertion of the sharpened end of the fluid sampling vessel through the septum 20.

An alternative embodiment for utilizing the inventive concept is illustrated in FIG. 3 in which the upper end of the cannister 10 is fitted with a small bore tube 32, which may be of any suitable rigid durable non-corrosive material such as stainless steel. The upper end of the tube 32 is extended by a length of the second small bore member 34 made of a soft material which may be crimped as shown at 36 to seal the upper end of the device. When it is desired to take a sample of the air in the entrapped enclosure the upper capillary member 34 may be cut off below the crimped portion and a flexible sleeve 38 inserted to allow connection with the inlet of a gas sampling vessel in the manner illustrated in FIG. 5.

Where it is desired to sample the subsurface gas compositions at a greater depth the cannister 10 can be buried at the desired depth as shown in FIG. 4 and an elongated small bore tube provided to extend to the surface where it is connected with a tube of soft material. In the embodiment shown in FIG. 4 there is a screen 40 at the bottom of the cannister to prevent the cannister from filling with soil or mud.

In FIG. 5 an additional modification is illustrated in which the lower end of the cannister is provided with a screen 40 and the entire lower end of the cannister is enclosed by a membrane 42 which, by being impermeable to water will prevent the cannister from filling with fluid, and by being permeable to volatile gases such as helium will allow for exchange of those indicator constituents between the subsurface soil environment and the entrapped gas pocket. For instance a membrane of latex rubber, silicone rubber, or plastic such as teflon will allow such transfer and yet impede fluids such as ground water.

Additional modifications will allow use of the inventive concept in sampling for indicator constituents in areas which are overlain by water. In FIG. 6 one embodiment is illustrated in which a cannister 44 provides a cavity or gas pocket reservoir 46. This cannister may be made of any substantial material such as brass, stainless steel or plastic. The lower end of the cannister is enclosed by a membrane 48 held in position by a supporting screen 50. The periphery of the open end of the membrane 48 as shown has a strengthened portion 52 and the lower end of the cannister has a corresponding groove 54 into which the strengthened portion 52 will fit to keep the membrane in place. The upper end of the cannister may be provided with a handle 56 by which it may be attached to a line for lowering it into the water.

The upper end of the internal cavity 46 of the cannister is sealed by a soft puncturable material such as silicone rubber in the form of a disc as shown at 58. This sealing disc is held in place by a washer 60 and a plug 62 which may be made of stainless steel or brass or other material and is threadably engaged with the top of the cannister. The washer and plug both have a central bore 64 to allow insertion of the small bore tube of a gas sampling vessel such as the type shown in FIG. 2.

Figure 8:
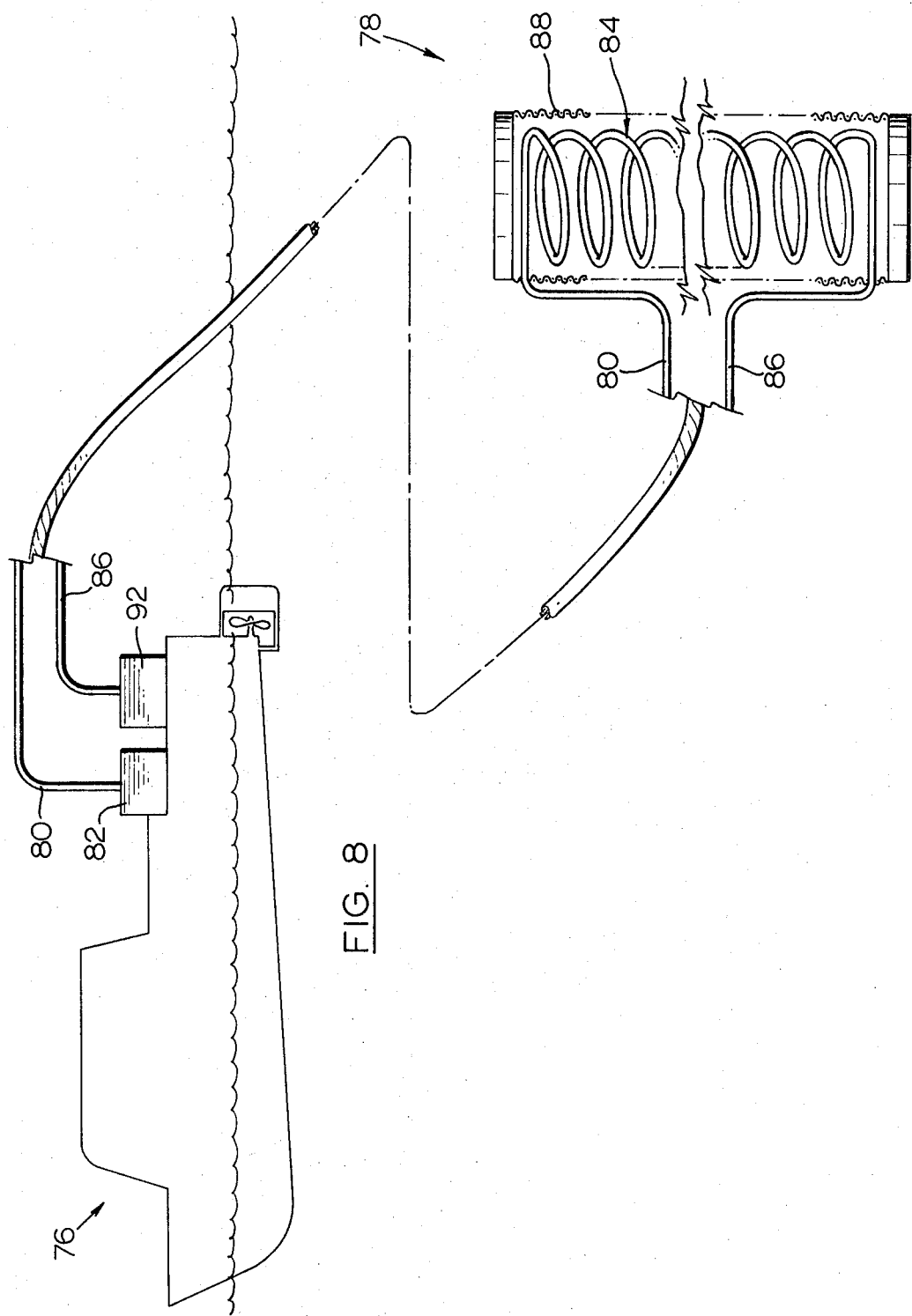
FIG. 8 shows a schematic representation of apparatus suitable for a method of geochemical prospecting in areas overlain by water.

When such a device as shown in FIG. 8 is lowered into the water the membrane 48 will keep the gas pocket entrapped and isolated from the surrounding water but will allow transfer of indicator constituents such as dissolved helium, hydrocarbon or other gas between the water and the entrapped gas pocket. When it is desired to sample the gas pocket a fluid sampling device which is shown in FIG. 2 may be inserted through the sealing disc or septum 58 into the interior of the cavity and a gas sample from the reservoir 46 removed for analysis to determine the presence of anomalous amounts of the indicator.

In FIG. 8 an additional septum 66 is also illustrated attached to the side of the membrane 48 to show an alternative means by which samples may be extracted from the gas pocket. The sharpened end of a capillary tube of a fluid sampling vessel may be inserted through the septum attached to the membrane to withdraw a sample.

It should be realized that the purpose of the septum is to provide a sort of seal around the capillary bore of the sampling vessel when a sample is being removed. In FIG. 1 the septum will allow the removal of a sample from the cannister without channelling of air from the atmosphere through the hole 18. In the case of the embodiment shown in FIG. 6 the septum 66 or 58 will allow insertion of the capillary tube of the sampling vessel for removal of a sample in a way which allow the entrapped pocket to be sealed again when the capillary tube is removed.

It should, however, be realized that once the septum is punctured it will be substantially ineffective in preventing the escape of helium from the internal gas pocket. Even an unpunctured septum of silicone rubber or similar material will allow such highly volatile indicators as helium to escape, as in fact will the membrane if the sampling device is removed for a length of time from the environment in which the indicator is present. Therefore the thickness of the membrane may also be a feature in the utility of the invention. The membrane should be thin enough to allow transfer of the volatile indicators in a reasonable time while the cannister is in place but thick enough so that the volatile indicators do not escape immediately when the cannister is raised to the surface where the effect of partial pressure will be to cause the entrapped pocket to equilibrate with the surrounding atmosphere by the same process of transfer through the membrane.

Figure 7:
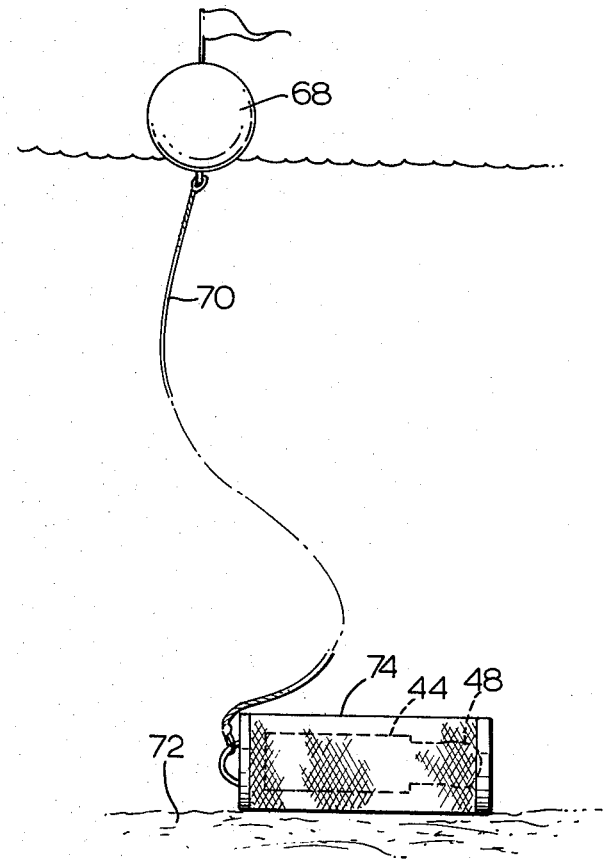
FIG. 7 shows a device of FIG. 6 in use.

In FIG. 7 the cannister and the membrane are generally shown at 44 and 48 and are enclosed in a protective screen or basket 74 lying at the bottom of a lake or river and attached to a marker buoy 68 at the surface of the water by a line 70. Thus the fluid sampler may be left at a location in the lake or river for a period of time and collected at a later date by means of the marker buoy. The cannister may be suspended at any depth but it should be realized that where it is desirable to detect indicator constituents in a seep emerging from considerable depth underground the concentrations of these indicators will be highest at the bottom of the lake or river where the seep enters the water phase rather than at an intermediate depth where the constituent indicators may have been diluted and dissipated into the water by currents.

Still other embodiments may be devised to use the inventive concept to prospect a given area overlain by water by a continuous traverse or by sampling at selected individual locations. Means for conducting such exploration is schematically illustrated in FIG. 8 wherein a boat 76 is used to pull through the water a sampling device shown generally at 78. The line 80 represents a hose or small bore tubing, impermeable to gas or water, connected to the boat at one end and at the other end connected to a number of coils of a tubing 84 made of a semi-permeable material such as teflon, latex rubber, etc. This semi-permeable tubing is designed as in the membrane in previous embodiments to present a barrier to the surrounding water but allow transfer of volatile indicator gases such as helium between the water phase and the internal atmosphere of the tubing. The line 86 connecting the other end of the semi-permeable tubing to the boat is another hose or tube made of material impermeable to gas or liquid.

To allow such a number of coils of semi-permeable tubing to be pulled through the water it may be necessary to have them contained within a wire screen or basket 88 as illustrated. Alternatively it might be possible to weave the tubing through the lattice of a stiff coarse screen material so as to protect the tubing and keep it together.

As the boat progresses along the traverse air is pumped in at 82 into the line 80 and travels through the line to enter the coils of semi-permeable tubing 84. The air travels through the coils of semi-permeable tubing and returns to the boat through the line 86 at the end of which is a device 92 suitable for either periodic sampling or for continuous analysis of the gas passing through the tubes. When the semi-permeable tubing passes through a water zone having a high concentration of a volatile indicator such as helium that constituent will tend to transfer through the semi-permeable wall of the tubing and result in a representatively high concentration in the air passing through the semi-permeable tube. Thus the air passing through the tubing will tend to become representative of the concentration of those indicator gases in the surrounding water. The presence of those indicators can be detected by sampling or by continuous analysis at 92, the end of the line 86, as the air returns to the boat. If the capacities and dimension of the tubing are known and the rate of air being pumped into the lines is known it will be relatively easy to calculate the time lapse between when the air is passing through the semi-permeable coils and when it reaches the sampling device at the end of the line 86. Thus it can be calculated what point in the traverse a given sample or analysis represents and a plot of the results of the gas analyses can be made on a map. In order to cover an entire area it may be necessary to run several traverses parallel to each other or at right angles to each other.

It should also be realized that the apparatus referred to above could be used for intermittent sampling of a body of water at periodic locations simply by lowering the semi-permeable tubing into the water at the location to be sampled and pumping a sufficient quantity of air through to get a representative sample at the sampling or analysis end of the line 86.

It should be understood that the time required for air or other known gases eithin the semi-permeable tube to approach equilibrium with the surrounding water will be a function of the surface area through which the exchange takes place and a function of the internal volume of the gas in the tubing. The larger the area of exchange, the faster equilibrium will tend to be achieved and the larger the gas volume within the tubing the slower equilibrium will tend to be achieved. Therefore it is desirable to have a semi-permeable tubing which is relatively long but which has a small internal diameter. Of course other configurations might be devised which would provide a large surface area for exchange and a small internal volume.

By calculations based on the experience of laboratory experiments I have estimated that a semi-permeable tube having a length of about 200 feet being made of teflon and having an internal diameter of 0.022 inch and a wall thickness of 0.006 to 0.010 inch will provide a sample capable of indication of helium anomalies in a period of about 10 seconds.

From a knowledge of the rate of flow of gas through the tubes it is possible to plot the helium gas concentrations along the traverse of the boat and thus to locate and plot areas of high concentration of the indicator constituents on a map.

Although the invention herein described is not limited to any specific dimensions or configurations the following information may be useful. I have found that in using the described method with a cannister of the type shown in FIG. 1 it is convenient to use a tube closed at one end being about 12 inches long and 1½ inches in diameter. I have also found that it is convenient to use a gas pocket having a dead volume in the order of 10 to 100 cubic centimetres and having an effective area for transfer of indicator constituents in the order of 1 to 100 square centimetres. In the device to be used in sampling bodies of water such as shown in FIG. 6 an internal pocket about 10 to 100 cubic centimetres is considered suitable and an area of transfer of about 1 to 500 square centimetres is believed sufficient. Membrane thicknesses, using material previously referred to, should be in the order of 0.0001 to 0.030 inch. It should additionally be understood that all of the above specifications depend largely on the conditions existing remembering that the time to approach equilibrium is a function of the area of transfer, of the volume of the gas pocket, the thickness of the membrane, as well as other factors such as constituent concentration and temperature, etc.

Although the foreoing includes specific methods for utilizing the inventive concept of this application it should be realized that various other devices and techniques might be devised for using this method without departing from the inventive concept.

What I claim is:

1. A method of geochemical prospecting by locating areas of anomalously high concentration of indicator constituent in the subsurface environment in which said concentration of indicator constituent is determined by presenting a pocket of known gas, entrapped in an open-bottomed, close-topped canister, having its open bottom in permeable or semi-permeable communication only with the subsurface environment so as to allow, and for sufficient time to allow, the indicator constituents in the subsurface soil to transfer to the gas pocket in the canister under the influence of its partial pressure gradient and thereafter analyzing the gas in said gas pocket to determine the concentration of indicator constituent, in which the indicator constituent is helium, and in which said open bottom of said canister is enclosed by a membrane permeable to the indicator constituent and impermeable to liquids.

2. A method as claimed in claim 1 in which said closed top of said canister has a puncturable septum, whereby contamination-free extraction of the sample from the canister may be obtained by insertion of a sharpened end of a sampling vessel.

3. A method as claimed in claim 1 in which said canister is submerged in the soil or in the water overlying the soil.

4. A method as claimed in claim 2 in which said canister is submerged in the soil or in the water overlying the soil.

5. A method of geochemical prospecting in areas overlain by water by locating areas of anomalously high concentration of indicator constituent, such as helium, in the subsurface environment in which said concentration of indicator constituent is determined by pumping a known gas through a tube material impermeable to liquids and permeable to the indicator constituent, while said tube is submerged in a body of water, and analyzing said known gas after it has been passed through tube to determine the concentration of indicator constituents.

6. A method as claimed in claim 5 in which said known gas is air, said tube is in the order of 200 feet long and has an internal diameter in the order of 0.022 inch and a wall thickness in the order of 0.006 to 0.01 inch and said air is passed through said tube during a period of approximately 10 seconds.

* * * * *